J. WRIGHT.
Churn.
No. 211,451. Patented Jan. 14, 1879.
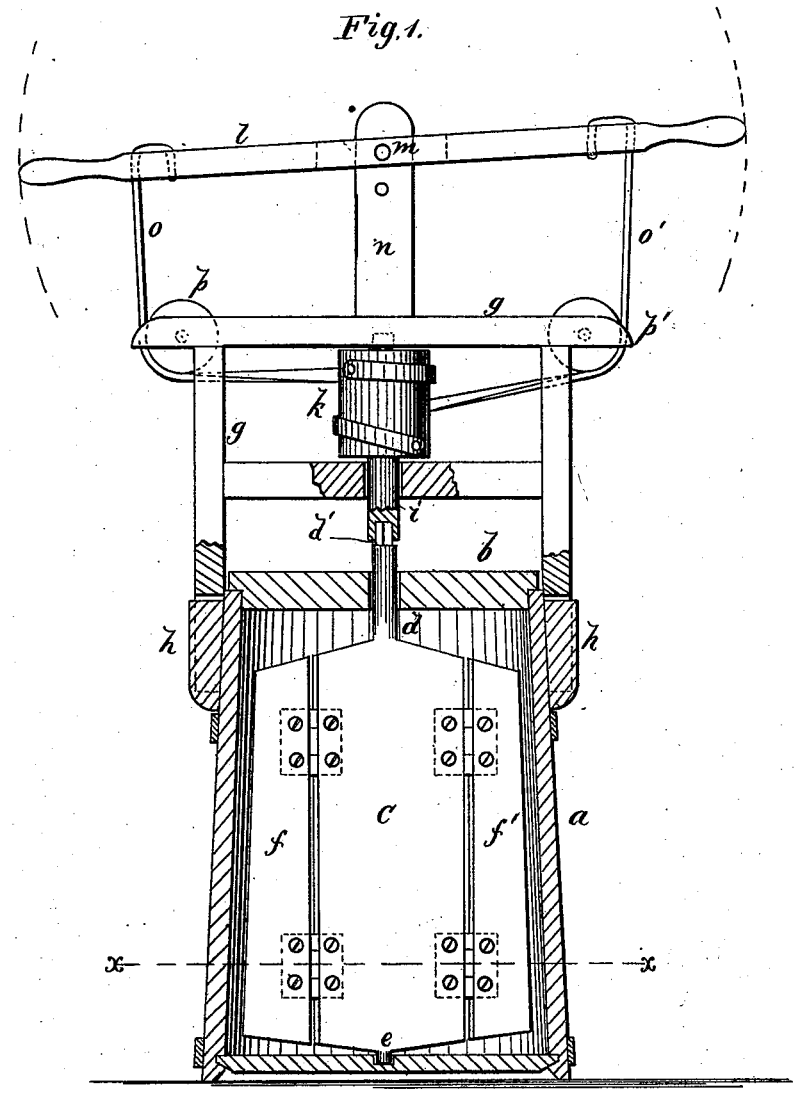
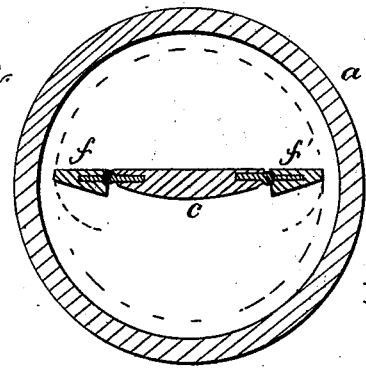
WITNESSES:
Henry N. Miller
C. Sedgwick
INVENTOR:
J. Wright
BY
ATTORNEYS.

UNITED STATES PATENT OFFICE.

JESSE WRIGHT, OF FAIRMOUNT, INDIANA.

IMPROVEMENT IN CHURNS.

Specification forming part of Letters Patent No. 211,451, dated January 14, 1879; application filed June 11, 1876.

*To all whom it may concern:*

Be it known that I, JESSE WRIGHT, of Fairmount, in the county of Grant and State of Indiana, have invented a new and useful Improvement in Churns, of which the following is a specification:

The object of my invention is to facilitate the labor of churning by applying the power in the most economical manner, and constructing the dashers in such a form as to cause the separation of the butter from the milk as rapidly as possible.

My invention consists in a revolving dasher nearly as wide as the interior diameter of the churn, so as to cause concussion of the cream between the edges of the dasher and sides of churn. The edges of the dasher are hinged to the center portion in such a way as to swing in opposite directions, so that as the dasher is reciprocated or alternately revolved, first in one direction and then in the other, one edge of the dasher is rigid against the cream, while the other edge gives or turns out of the way of the cream, forming the wake of the rigid edge. This alternate motion of the dasher opens the mass of cream in the center, thereby allowing air to enter and mix with the cream to facilitate the separation of the butter.

The power to revolve the dasher is applied by a reciprocating lever connected by straps or belts to a pulley on the dasher, so that as the lever is worked the straps are alternately wound and unwound on the pulley and an alternate revolution imparted to the dasher.

In the drawing, Figure 1 is a sectional elevation of my improved churn, and Fig. 2 is a section plan at the line $x\ x$.

Similar letters of reference indicate corresponding parts.

$a$ represents a churn of the form known as "upright," and $b$ is the cover thereof. $c$ is the dasher, with a stem, $d$, passing through the cover $b$, and pivoted at $e$ in the bottom of the churn.

The center portion, $c$, of the dasher is formed broad and flat, with the edges or lips $f\ f'$ hinged thereto so as to turn toward the center in opposite directions, as shown by dotted lines in Fig. 2.

$g\ g$ is a frame, of wood or metal, supported over the top of the churn by sockets $h\ h$, from which the frame may be unshipped at pleasure. $i$ is a short shaft or arbor supported in bearings in the frame $g$, and having a pulley or enlargement, $k$, upon it. The lower end of the shaft $i$ is formed as a square socket, which fits upon the squared end, $d'$, of the dasher-stem $d$.

$l$ is a lever hung horizontally on a pin or fulcrum, $m$, at its center upon the post or upright $n$ at the top of the frame $g$. $o\ o'$ are straps or belts secured by one end near the opposite ends of the lever $l$, and passing over friction-wheels $p\ p'$ on the frame $g$, and from thence around the pulley $k$ in opposite directions, to which pulley $k$ the ends of the straps $o\ o'$ are fastened.

By oscillating the lever $l$ upon its center in the direction shown by dotted lines in Fig. 1, the straps $o\ o'$ are alternately wound and unwound upon the pulley $k$, thereby imparting a revolution, first in one direction and then in the other, to the shaft $i$ and dasher $c$. During these revolutions of the dasher one of the hinged portions, $f$ or $f'$, is rigid upon the center portion, $c$, and the cream is forced through the narrow opening between the side of the churn $a$ and the edge $f$ or $f'$, causing concussion and breaking up the globules of the cream, while the other edge, $f$ or $f'$, may turn back and allow a wider opening for the cream to pass.

The lever $l$ affords a means for conveniently and easily revolving the dasher, and it may be operated by one or two persons, and it is especially adapted for the use of women and children.

The frame $g\ g$ can be readily removed from the churn by unshipping it from the sockets $h\ h$, the socket and squared end, $d'$, of the dasher-stem allowing of the entire removal of the operating devices.

The support $n$ for the lever $l$ may be provided with a number of holes for the fulcrum $m$ to enable the lever $l$ to be hung at different heights.

I do not confine myself to the exact construction of the parts as set forth, as they may be varied, and my form of dasher and means for revolving the same may be applied to a barrel or other kind of churn.

Having thus described my invention, I claim as new and desire to secure by Letters Patent—

The flat oscillating churn-dasher $c$, having wings $f\ f'$ hinged to its sides in such a manner as to open toward each other, substantially as and for the purpose set forth.

JESSE WRIGHT.

Witnesses:
   JOHN F. JONES,
   ZEP. GOSSETT.